United States Patent
Forster

(10) Patent No.: US 9,317,726 B2
(45) Date of Patent: Apr. 19, 2016

(54) RADIO FREQUENCY IDENTIFICATION SENSOR ASSEMBLY

(71) Applicant: Avery Dennison Corporation, Pasadena, CA (US)

(72) Inventor: Ian J. Forster, Essex (GB)

(73) Assignee: Avery Dennison Corporation, Glendale, CA (US)

( * ) Notice: Subject to any disclaimer, the term of this patent is extended or adjusted under 35 U.S.C. 154(b) by 111 days.

(21) Appl. No.: 13/803,397

(22) Filed: Mar. 14, 2013

(65) Prior Publication Data

US 2013/0278387 A1    Oct. 24, 2013

Related U.S. Application Data

(60) Provisional application No. 61/636,927, filed on Apr. 23, 2012.

(51) Int. Cl.
*H04Q 5/22* (2006.01)
*G06K 7/10* (2006.01)
*G06K 19/07* (2006.01)

(52) U.S. Cl.
CPC ........ *G06K 7/10366* (2013.01); *G06K 19/0717* (2013.01)

(58) Field of Classification Search
CPC .............. G06K 7/10366; G06K 19/0717
USPC .......... 340/10.1–10.6, 572.1–572.9; 235/375–385
See application file for complete search history.

(56) References Cited

U.S. PATENT DOCUMENTS

| | | | | |
|---|---|---|---|---|
| 6,970,092 B2* | 11/2005 | Hum et al. | ................. | 340/573.4 |
| 7,295,114 B1* | 11/2007 | Drzaic et al. | ................ | 340/572.1 |
| 7,773,025 B2* | 8/2010 | Holly et al. | ..................... | 342/13 |
| 8,519,847 B2* | 8/2013 | Honkanen et al. | ......... | 340/572.1 |
| 8,593,348 B2* | 11/2013 | Krupa et al. | ........... | 343/700 MS |
| 8,830,034 B2* | 9/2014 | Burke | .......................... | 340/10.1 |
| 8,854,190 B2* | 10/2014 | Bodapati et al. | ............. | 340/10.2 |
| 2006/0019540 A1* | 1/2006 | Werthman et al. | ............ | 439/620 |
| 2006/0238303 A1* | 10/2006 | Loving | .......................... | 340/10.1 |
| 2006/0238305 A1* | 10/2006 | Loving et al. | ................ | 340/10.1 |
| 2006/0244606 A1* | 11/2006 | Li et al. | ...................... | 340/572.7 |
| 2008/0012579 A1* | 1/2008 | Kuhns et al. | .................. | 324/652 |
| 2008/0309490 A1* | 12/2008 | Honkanen et al. | ......... | 340/572.1 |
| 2010/0123583 A1* | 5/2010 | Bommer et al. | ........... | 340/572.7 |

FOREIGN PATENT DOCUMENTS

WO    WO-2009034534    3/2009

OTHER PUBLICATIONS

International Search Report and Written Opinion dated Oct. 28, 2014 for International Application No. PCT/US2013/031200.

* cited by examiner

*Primary Examiner* — Kerri McNally
(74) *Attorney, Agent, or Firm* — Avery Dennison Corporation

(57) ABSTRACT

In accordance with one embodiment, an RFID sensor assembly comprises a sensing RFID chip and a reference RFID chip. The sensing RFID chip and the reference RFID chip are configured for electrical coupling to an electronic component via a coupling arrangement. The coupling arrangement of the sensing RFID chip is configured to vary a coupling property in response to a sensed parameter.

16 Claims, 3 Drawing Sheets

RADIO FREQUENCY IDENTIFICATION SENSOR ASSEMBLY

CROSS-REFERENCE TO RELATED APPLICATION

The present application claims the benefit of U.S. Provisional Patent Application No. 61/636,927 filed Apr. 23, 2012, which is incorporated herein by reference in its entirety.

BACKGROUND

A conventional RFID sensor assembly can be deployed to sense environmental conditions and communicate environmental data to a nearby RFID reader. The conventional RFID sensor assembly transmits signals encoded with the environmental data.

SUMMARY

In accordance with one embodiment, an RFID sensor assembly comprises a sensing RFID chip and a reference RFID chip. The sensing RFID chip and the reference RFID chip are configured for electrical coupling to an electronic component via a coupling arrangement. The coupling arrangement of the sensing RFID chip is configured to vary a coupling property in response to a sensed parameter.

BRIEF DESCRIPTION OF THE DRAWINGS

It is believed that certain embodiments will be better understood from the following description taken in conjunction with the accompanying drawings in which.

DETAILED DESCRIPTION

Figure 1:
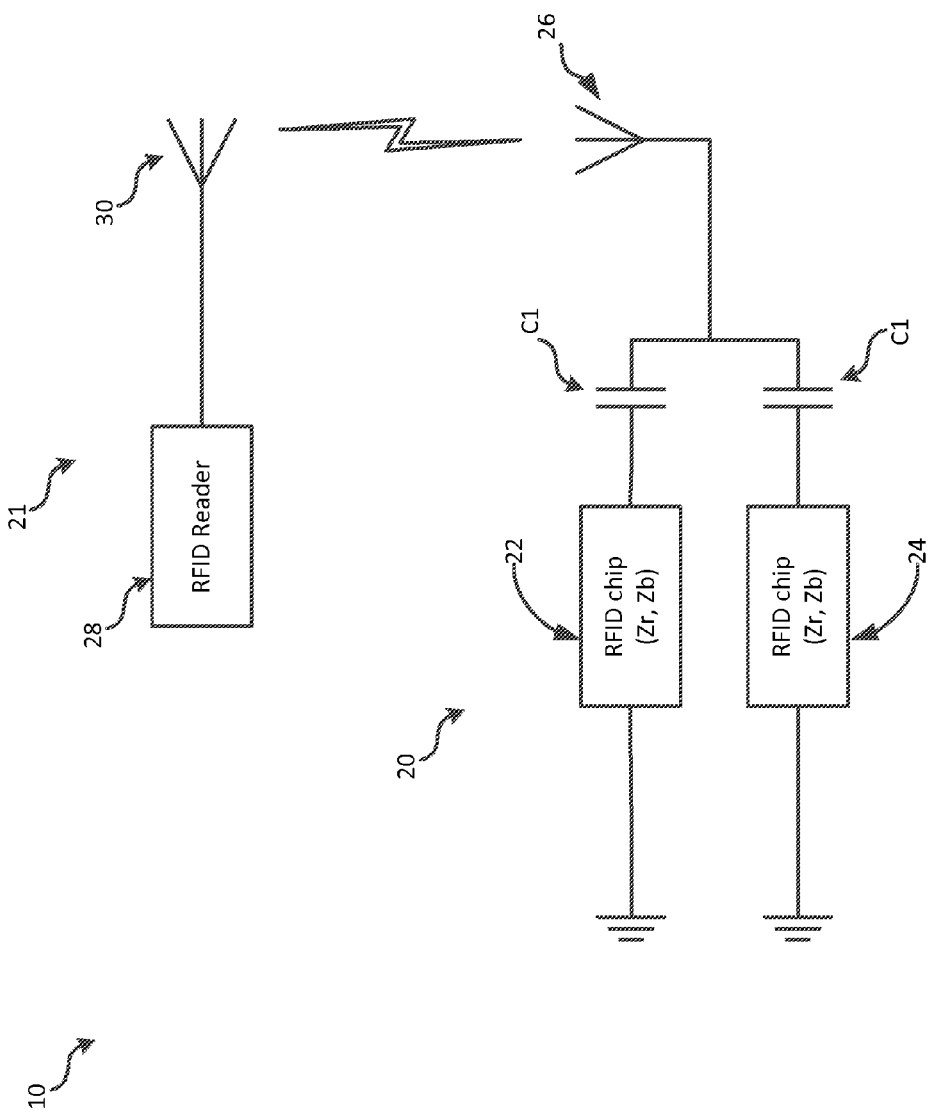
FIG. 1 is schematic view depicting a system that includes an RFID reader and an RFID sensor assembly in accordance with one embodiment, the RFID sensor assembly includes a first RFID chip, a second RFID chip, and an antenna.
Figure 2:
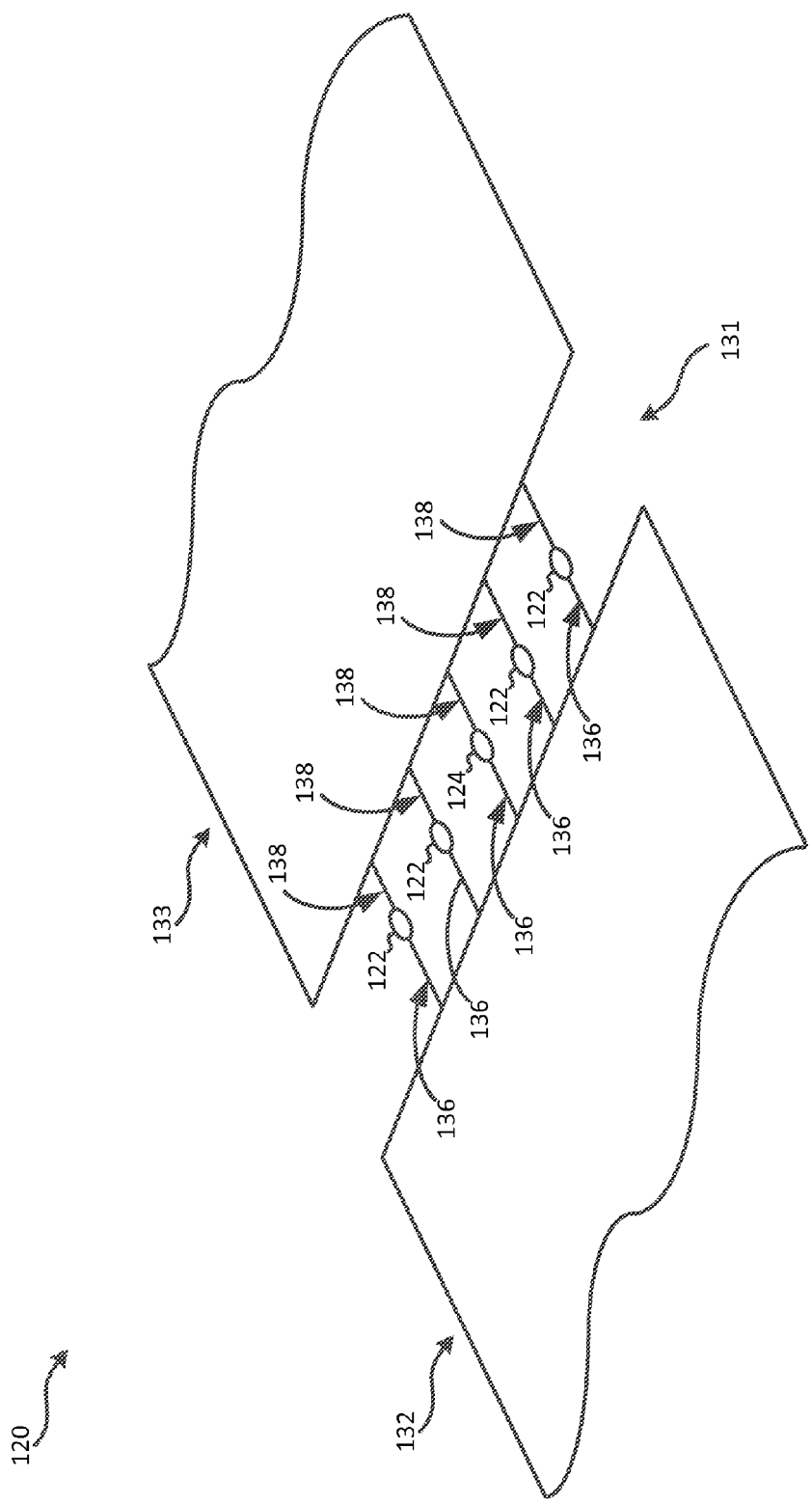
FIG. 2 is a perspective view of an RFID sensor assembly in accordance with another embodiment, wherein the RFID sensor assembly is associated with a dipole antenna.
Figure 3:
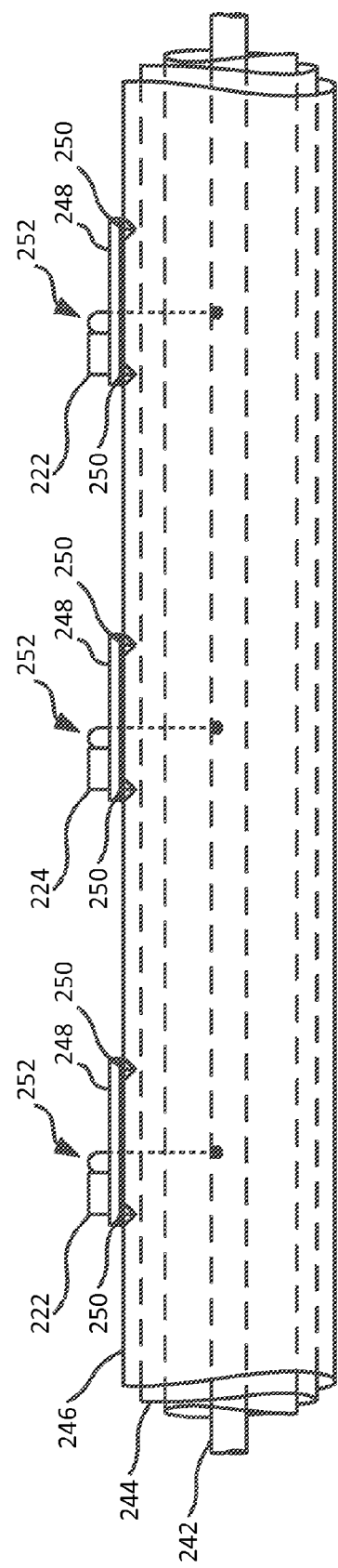
FIG. 3 is a schematic view depicting a RFID sensor assembly in accordance to yet another embodiment, wherein the RFID sensor assembly is associated with a transmission line.

The apparatus and methods disclosed in this document are described in detail by way of examples and with reference to FIGS. 1-3. Unless otherwise specified, like numbers in FIGS. 1-3 indicate references to the same, similar, or corresponding elements throughout the figures. It will be appreciated that modifications to disclosed and described examples, arrangements, configurations, components, elements, apparatuses, methods, materials, etc. can be made and may be desired for a specific application. In this disclosure, any identification of specific shapes, materials, techniques, arrangements, etc. are either related to a specific example presented or are merely a general description of such a shape, material, technique, arrangement, etc. Identifications of specific details or examples are not intended to be, and should not be, construed as mandatory or limiting unless specifically designated as such. Selected examples of apparatus and methods for a method of providing a plurality of RFID sensors to facilitate detection of an environmental condition are hereinafter disclosed and described in detail with reference made to FIGS. 1-3.

An RFID system 10 is illustrated in FIG. 1. The RFID system 10 includes an RFID sensor assembly 20 and an RFID interrogator 21. The RFID sensor assembly 20 can be configured to facilitate remote determination, detection, or measurement of certain properties or conditions of the environment surrounding or in contact with the RFID sensor assembly 20 (e.g., a sensed parameter). In one example, the RFID sensor assembly 20 can be arranged to determine the humidity, temperature, or atmospheric pressure of the environment surrounding the RFID sensor assembly 20. In another example, the RFID sensor assembly 20 can be arranged to determine the presence of a specific or general class of airborne chemical agents or chemicals that directly contact the RFID sensor assembly 20. In yet another example, the RFID sensor assembly 20 can be secured to an object and arranged to determine physical changes experienced in the object due to forces that result in stress or strain. It will be appreciated that the RFID sensor assembly 20 can be configured to detect any combination of sensed parameters. Although many examples provided herein describe the RFID sensor assembly 20 as arranged to detect certain sensed parameters, it will be understood that other sensors described herein or known to persons of ordinary skill in the art can be used with these many examples upon reading and understanding this disclosure.

The RFID sensor assembly 20 can be configured to include a pair of RFID chips—a sensing RFID chip 22 and a reference RFID chip 24. The RFID chips 22, 24 can be electrically coupled to a common antenna 26 by respective coupling capacitors C1, C2. The RFID chips 22, 24 can be arranged to store and/or derive information and encode such information onto radio signals generated by or passing through the RFID chips 22, 24. The common antenna 26 can be arranged to facilitate communication between the RFID sensor assembly 20 and remote devices such as, for example, the RFID interrogator 21. The common antenna 26 ensures that the effects of the environment around the RFID tag are the same for both RFID chips reducing measurement errors that would otherwise reduce the capability of the sensor.

The RFID interrogator 21 can inclued an RFID reader 28 and an antenna 30 that are arranged to facilitate communication with the RFID sensor assembly 20. For example, the antenna 30 can transmit signals to the RFID sensor assembly 20. The common antenna 26 can receive the signals from the RFID reader 28 and direct those signals to at least one of the RFID chips 22, 24. The common antenna 26 can also receive signals from the RFID chips 22, 24 and send or transmit such signals to be received at the antenna 30 of the RFID interrogator 21.

Signals transmitted from each RFID chip 22, 24 can be transmitted at a particular power sensitivity. The power sensitivity of the signal from the sensing RFID chip 22 can vary as a function of the sensed parameter. The power sensitivity of the signal from the reference RFID chip 24 can remain substantially constant (e.g., unaffected by the sensed parameter). The difference between the power sensitivities of each of the signals can facilitate the determination, detection, or measurement of the sensed parameter. In one example, the reference RFID chip 24 can transmit a reference signal having a substantially constant power sensitivity of about −12 dBm. The power sensitivity of the signal from the sensing RFID chip 22 can range from between about 0 dBm to about −12 dBm. As the sensed parameter surrounding the RFID sensor assembly 20 changes, the power sensitivity of the signal from the sensing RFID chip 22 can correspondingly change (e.g., between about 0 dBM and −12 dBm). The RFID reader 28 can compare the power sensitivities of the respective signals to facilitate determination of the magnitude, concentration, and/or presence of the sensed parameter. It will be appreciated that the sensed parameter can be determined, detected, and/or measured from any of a variety of suitable alternative signal parameters, such as for example, a variable frequency, a variable phase shift, a variable amplitude, and/or encoded data, for example.

The respective signals from the RFID chips 22, 24 can each be encoded with a unique identifier. The RFID interrogator 21 can interrogate and the RFID reader 28 can identify each of the RFID chips 22, 24 according to their unique identifier. In one embodiment, the RFID interrogator 21 can initiate communication with the sensor assembly 20 using an inventory scan. For example, the RFID interrogator 21 can send an initial interrogation signal to determine the number and identity of all RFID chips in the vicinity of the RFID interrogator 21. All RFID chips in the vicinity of the RFID interrogator 21 can respond to the interrogation signal with information including its unique identifier. The RFID reader 28 can inventory and catalog all responding RFID chips and can initiate communication with individual RFID chips or groups of RFID chips with subsequent interrogation signals. Once the RFID chips 22, 24 are identified by their unique identifier, the RFID reader 28 can begin detecting the sensed parameter based on signals from the sensing RFID chip 22 and the reference RFID chip 24. It will be appreciated that the signals from the RFID chips 22, 24 can be encoded with any of a variety of additional or alternative information such as calibration data or the type of sensed parameter(s) being detected, for example.

As illustrated in FIG. 1, the RFID chips 22, 24 can each have a characteristic receive impedance Zr and a characteristic backscatter impedance Zb. The characteristic receive impedance Zr and backscatter impedance Zb of the sensing RFID chip 22 can be configured to vary as a function of the sensed parameter. The characteristic receive impedance Zr and backscatter impedance Zb of the reference RFID chip 24 can be configured to remain substantially constant regardless of the state of the sensed parameter. The characteristic receive impedance Zr and backscatter impedance Zb can affect the power sensitivities of the respective signals from the RFID chips 22, 24, and also the characteristics of a modulated reflected signal re-radiated to a reader system. As the characteristic receive impedance Zr and backscatter impedance Zb of the sensing RFID chip 22 varies, the power sensitivity of the signal can also vary. It will be appreciated that any of a variety of other chip features and/or properties can be varied to change the signal from the chip to facilitate determination, detection, or measuring of the sensed parameter.

The RFID reader 28 can be configured to vary (e.g., sweep) the power and frequency of the signal transmitted to the RFID chips 22, 24. As the power and frequency of the signal varies, the RFID chips 22, 24 can respond by transmitting a complex backscattered signal to the RFID reader 28. The characteristics of the complex backscattered signals can be analyzed relative to the power and frequency of the signal from the RFID reader 28. The RFID reader 28 can also be configured to additionally or alternatively increase the power of the signal to the RFID chips 22, 24 above a threshold value to induce a non-linear backscattered signal from the RFID chips 22, 24. The RFID reader 28 can analyze the non-linearity to facilitate determination, detection, or measurement of the sensed parameter. It will be appreciated that the RFID reader 28 can be configured to vary any of a variety parameters of its signal to facilitate effective communication with the RFID chips 22, 24 and/or effective analysis of a backscatter signal or other appropriate signal.

In one embodiment, as illustrated in FIG. 2, an RFID sensor assembly 120 can be provided to facilitate determination, detection, or measurement of a sensed parameter for a dipole antenna 131. The RFID sensor assembly 120 can comprise a plurality of RFID chips 122, 124. The RFID sensor assembly 120 and the RFID chips 122, 124 can be similar in many respects to the RFID sensor assembly 20 and the RFID chips 22, 24 described above with respect to FIG. 1. The plurality of RFID chips 122, 124 can be distributed along a length of the dipole antenna 131. Each RFID chip 122, 124 can extend between opposing elements 132, 134 of the dipole antenna 131. In the example illustrated in FIG. 2, one of the RFID chips can be a reference RFID chip 124 and the remaining RFID chips can be sensing RFID chips 122. In some applications it will advantageous to distribute the sensing RFID chips 122 along the dipole antenna 131, so that information about the sensed parameter can be collected at discrete points along the dipole antenna 131. Any differences in the sensed parameter along the length of the dipole antenna 131 can be effectively detected without requiring installation of a plurality of individual RFID sensors which can be costly and time consuming. In other applications, having the RFID chips performing the sensing and the chips acting as the reference as close as possible together, to ensure they are being exposed to exactly the same environment, will be preferable.

As illustrated in FIG. 2, each of the RFID chips 122, 124 can be electrically coupled to the dipole antenna 131 by first and second links 136, 138. The RFID chips 122, 124 can be in electrical communication with respective first and second links 136, 138. Each of the first and second links 136, 138 can be attached to opposing elements 132, 134 of the dipole antenna 131 such that the RFID chips 122, 124 are conductively coupled to the dipole antenna 131. During operation of the dipole antenna 131, a current signal or other suitable signal from the dipole antenna 131 can be provided through the RFID chips 122, 124. The first and second links 136, 138 of the sensing RFID chips 122 can be configured such that the conductivity of the links 136, 138 varies in response to the sensed parameter. In one embodiment, the first and second links 136, 138 can be formed from an environmentally sensitive material or compound. Varying the conductivity of the first and second links 136, 138 can vary the characteristic receive impedance Zr and backscatter impedance Zb of the RFID chips 122, 124 thereby affecting the power sensitivity of the transmitted signals.

The first and second links 136, 138 of the reference RFID chip 124 can be configured such that the conductivity of the links 136, 138 remains substantially constant in response to the sensed parameter. In one embodiment, the first and second links 136, 138 can be formed of a material or compound having a substantially constant conductivity (e.g., that does not vary in response to the sensed parameter). The characteristic receive impedance Zr and backscatter impedance Zb can accordingly remain substantially constant such that the power sensitivity of the transmitted signals from the reference RFID chip 124 also remains substantially constant. Although FIG. 2 illustrates one reference RFID chip 124 positioned centrally among four sensing RFID chips 122, it will be appreciated that an RFID sensor assembly can include any quantity of either sensing RFID chips 122 or reference RFID chips 124 comprising any number of combinations of the sensing RFID chips 122 and reference RFID chips 124. In addition, the sensing RFID chips 122 and reference RFID chip(s) 124 can be positioned in any number of arrangements to facilitate the determination, detection, or measurement of a sensed parameter. In an alternative embodiment, the RFID chips may be mounted onto a sub assembly such as a strap or interposer, and the coupling between said strap and the antenna, that may be conductive, reactive or a combination of both, may vary in response to the sensed parameter.

The signals from the sensing RFID chips 122 of the RFID sensor assembly 120 can interact with each other. The sensing RFID chips 122 can be separated into discrete groups (e.g., data sets) based upon the signal interactions. These discrete groups can facilitate effective detection of the sensed parameter when using distributed sensing RFID chips 122 (e.g., as illustrated in FIG. 2).

In another embodiment, as illustrated in FIG. 3, an RFID sensor assembly 220 can be provided to facilitate determination, detection, or measurement of a sensed parameter for a coaxial transmission line 240. The RFID sensor assembly 220 can comprise a plurality of RFID chips 222, 224. The RFID sensor assembly 220 and the RFID chips 222, 224 can be similar in many respects to the RFID sensor assembly 20 and the RFID chips 22, 24 described above with respect to FIG. 1. The plurality of RFID chips 222, 224 can be distributed along a length of the coaxial transmission line 236. One of the RFID chips can be a reference RFID chip 224 and the remaining RFID chips can be sensing RFID chips 222. The coaxial transmission line can include a conductor 242, a braided shield 244, and an insulating sheath 246. Each RFID chip 222, 224 can be supported upon a substrate 248. The substrate 248 can be attached to the insulating sheath 246 with cleats 250. The cleats 250 can be configured such that they only extend partially into the insulating sheath 246 so as not to contact the braided shield 244 and can thus prevent any interference with the operation of the coaxial transmission line 240. The RFID chips 222, 224 can be electrically coupled to the conductor 242 with a penetrating clip 252. Each of the penetrating clips 252 can extend through the insulating sheath 246 and the braided shield 244 and into electrical contact with the conductor 242.

During operation of the coaxial transmission line 240, a current signal or other suitable signal from the conductor 242 can be provided to the RFID chips 222, 224 from the penetrating clips 252. The respective penetrating clips 252 of the sensing RFID chips 222 can be configured such that the coupling of the penetrating clips 252 varies in response to the sensed parameter. In this context, coupling can include conductive or reactive connection. In one embodiment, the penetrating clips 252 can be formed from an environmentally sensitive material or compound. Varying the coupling of the penetrating clips 252 can vary the characteristic receive impedance Zr and backscatter impedance Zb of the RFID chips 222 thereby affecting the power sensitivity or other parameters of the signals exchanged between the reader system and the chips. The penetrating clips 252 of the reference RFID chip 224 can be configured such that the coupling of the penetrating clips 252 remains substantially constant in response to the sensed parameter. In one embodiment, the penetrating clips 252 can be formed either of a material or compound having a substantially constant coupling (e.g., that does not vary in response to the sensed parameter), or have a physical structure that ensures that the coupling does not vary. The characteristic receive impedance Zr and backscatter impedance Zb can accordingly remain substantially constant such that the power sensitivity of the transmitted signals also remains substantially constant.

In one embodiment, the RFID reader (e.g., such as the RFID 28 illustrated in FIG. 1) and the RFID sensor assembly 220 can communicate directly over the coaxial transmission line 240 instead of through wireless communication. The RFID reader and the RFID chips 222, 224 can accordingly be manufactured without antennas (e.g., antennas 26 and 30 as illustrated in FIG. 1) which can reduce the overall cost of the RFID reader and/or RFID sensor assembly 220. The RFID reader can instead be directly coupled to the conductor 242 of the coaxial transmission line 240 such as with a T-splice type arrangement, for example. The RFID reader can be configured to transmit a broadband signal over the coaxial transmission line 240. The broadband signal can communicate with RFID chips 222, 224 at a distance that would be too distant for wireless communication. The RFID chips 222, 224 can accordingly be distributed along more of the coaxial transmission line 240 than would be possible with wireless communication. The RFID reader, the spacing between the RFID chips 222, 224, and the number and position of sensing RFID chips 222 and reference RFID chip(s) 224 can each be selected to facilitate effective communication between the RFID reader and the RFID chips 222, 224. For example, the RFID reader can be equipped to use a direct sequence spread spectrum communication system having, for example a 100 Mc (mega chip) bi-phase modulation with a suitable pseudo random code sequence. The RFID chips 222, 224 can be spaced about 1 meter apart along the coaxial transmission line 240. The RFID reader can be configured to isolate the responses from the RFID chips 222, 224 in the time domain by performing a correlation to facilitate independent communication with each of the RFID chips 222, 224.

It will be appreciated that an RFID chip 222, 224 can be electrically coupled to an electrical component with any of a variety of suitable alternative conductive coupling arrangements (e.g., direct ohmic connections). For example, a plurality of RFID chips 222, 224 can be distributed along a length of a balanced transmission line. The RFID chips 222, 224 can be attached directly to an outer conductive surface of the transmission line with adhesive. The sensing RFID chips 222 can be attached with a conductive adhesive that has a conductivity that varies as a function of a sensed parameter such as an ionic solvent or analyte, for example. The reference RFID chip(s) 224 can be attached with an insulating adhesive.

In such an example, the interactions between the sensing RFID chips 222 can be controlled by appropriately spacing the RFID chips 222 apart from each other. In one example, the RFID chips 222 can be spaced apart about one-quarter of a wavelength of the backscatter signal frequency which can effectively isolate the sensing RFID chips 222 from one another thereby reducing interactions.

Although FIG. 3 illustrates one reference RFID chip 224 positioned centrally among two sensing RFID chips 222, it will be appreciated that an RFID sensor assembly can include any quantity of either sensing RFID chips 222 or reference RFID chips 224 comprising any number of combinations of the sensing RFID chips 222 and reference RFID chips 224. In addition, the sensing RFID chips 222 and reference RFID chip(s) 224 can be positioned in any number of arrangements to facilitate the determination, detection, or measurement of a sensed parameter.

It will also be appreciated that RFID chips can additionally or alternatively be electrically coupled to an electrical component inductive coupling, such as through electric field coupling and/or magnetic field coupling, for example. Certain parameters of those coupling arrangements can vary. It will also be appreciated that any of a variety of parameters of the coupling arrangement, such as a capacitance, a mutual inductance, a mutual coupling coefficient, resistance or dielectric/magnetic loss, for example, can vary in response to a sensed parameter to facilitate detection of the sensed parameter.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art.

What is claimed is:

1. An RFID system comprising:
   an RFID sensor assembly with at least one pair of RFID chips in which at least one chip of the pair is a sensing RFID chip and at least one chip of the pair is a reference chip; and
   an RFID interrogator wherein the interrogator includes an RFID reader and a first antenna such that the reader is configured to vary a power and frequency of a signal transmitted to the at least one pair of RFID chips;
   wherein the at least one pair of RFID chips is coupled to a second antenna and the sensor assembly detects any combination of sensed parameters.

2. The system of claim 1, wherein the sensed parameters are a specific or general class of airborne chemicals.

3. The system of claim 1, wherein the at least one pair of RFID chips are electrically coupled to the second antenna by respective coupling capacitors.

4. The system of claim 1, wherein the at least one pair of chips are encoded with a unique identifier.

5. The system of claim 1, wherein the interrogator communicates with the sensor assembly using an inventory scan.

6. The system of claim 1, wherein each RFID chip has a characteristic receive impedance Zr and characteristic backscatter impedance Zb.

7. A method of utilizing a RFID sensor assembly comprising:
   providing a RFID sensor assembly having at least one pair of RFID chips, and a RFID interrogator wherein the interrogator includes a RFID reader and a first antenna with the at least one pair of RFID chips coupled to a second antenna such that the reader is configured to vary a power and frequency of a signal transmitted to the at least one pair of RFID chips;
   transmitting signals to the RFID sensor assembly via the first antenna;
   receiving the signals by the second antenna;
   directing those signals to at least one the pair of RFID chips; and
   determining a sensed parameter such that at least one RFID chip is configured to vary a coupling property in response to a sensed parameter.

8. The method of claim 7, further comprising sending signals to the first antenna of the RFID interrogator.

9. The method of claim 7, wherein the signals are encoded with a unique identifier.

10. The method of claim 7, wherein the method further comprising interrogating the RFID reader and identifying each RFID chip according to their unique identifier.

11. The method of claim 7, wherein the at least one pair of RFID chips is coupled to a dipole antenna.

12. The method of claim 11, wherein the at least one pair are in electrical communication with first and second links.

13. The method of claim 12, wherein the first and second links are configured such that a conductivity of the links remains constant in response to a sensed parameter.

14. The method of claim 12, wherein the first and second links are forms of a material compound having substantially constant conductivity.

15. The method of claim 7, wherein the at least one pair of RFID chips includes at least one sensing RFID chip.

16. The method of claim 7, wherein the at least one pair of RFID chips includes at least one reference RFID chip.

* * * * *